US005722603A

United States Patent [19]
Costello et al.

[11] Patent Number: 5,722,603
[45] Date of Patent: Mar. 3, 1998

[54] PROCESS FOR SEPARATION AND RECOVERY OF WASTE CARPET COMPONENTS

[75] Inventors: Michael Robert Costello, Chester, Va.; Bernd Roman Keller, Obbicht, Netherlands

[73] Assignee: AlliedSignal Inc. /DSM N.V., Morristown, N.J.

[21] Appl. No.: 563,810

[22] Filed: Nov. 28, 1995

[51] Int. Cl.⁶ .................................................. B02C 19/12
[52] U.S. Cl. .................... 241/20; 241/24.12; 241/24.18; 241/DIG. 38
[58] Field of Search ................ 241/19, 20, 24.12, 241/29, DIG. 38, 24.18

[56] References Cited

U.S. PATENT DOCUMENTS

| | | | |
|---|---|---|---|
| 3,843,060 | 10/1974 | Colburn | 241/24 |
| 4,028,159 | 6/1977 | Norris | 156/94 |
| 4,158,646 | 6/1979 | Benkowski et al. | 260/2.3 |
| 5,230,473 | 7/1993 | Hagguist et al. | 241/3 |
| 5,497,949 | 3/1996 | Sharer | 241/76 |
| 5,518,188 | 5/1996 | Sharer | 241/14 |
| 5,535,945 | 7/1996 | Sferrazza et al. | 241/24.12 |
| 5,598,980 | 2/1997 | Dilly-Louis et al. | 241/20 |

FOREIGN PATENT DOCUMENTS

| | | |
|---|---|---|
| 0681896 | 11/1995 | European Pat. Off. |
| 2900666 | 7/1980 | Germany. |
| WO 94/06763 | 3/1994 | WIPO. |

OTHER PUBLICATIONS

Horst Ninow, "Is Recycling Effective for the Carpet Industry?", Intercarpet 81—Enka AG, Wuppertal—Translation (No Date Given).
Dr. Roger A. Smith, Dr. Brian E. Gracon, E.I. DuPont de Nemours & Co., Inc., "Polyamide 66 and 6 Chemical Recycling", Recycle '95 presentation.
International Polymer Science and Technology, vol. 21, No. 3, (1994), "Material Recycling of Textile Floor Coverings" by D. Wustenberg & S. Schnell, pp. T1—T9.

*Primary Examiner*—John M. Husar
*Attorney, Agent, or Firm*—Melanie L. Brown; Virginia S. Andrews

[57] ABSTRACT

A process for separating and recovering waste carpet material components, especially face fiber material, includes removing adhesive material from the waste carpet material feedstock to obtain a mixture containing face fiber material which is passed with a liquid medium to a hydrocyclone, where the solids in the mixture are separated on the basis of specific gravity, and recovered. The recovered components can then be processed into desired products.

19 Claims, 2 Drawing Sheets

FIG. 1

PROCESS FOR SEPARATION AND RECOVERY OF WASTE CARPET COMPONENTS

FIELD OF THE INVENTION

The present invention relates to a process for separation and recovery of components of waste carpet. More particularly the present invention relates to the separation and recovery of the face fiber material from waste carpet material for subsequently processing into desired products.

BACKGROUND OF THE INVENTION

Broadloom carpets include a face fiber that is adhered to a backing, or support, which may include jute or polypropylene, with a latex adhesive (such as a styrene-butadiene rubber (SBR)) containing a variety of inorganic materials such as calcium carbonate, clay or hydrated alumina fillers.

As a first example, the majority of tufted broadloom carpets marketed in the United States comprise a face fiber (such as nylon 6, nylon 66 or polyester fibers) embedded or tufted in a primary backing that employs polypropylene fabric as the backing material. After the face fiber is tufted through the primary backing, an adhesive is applied to the back side of the carpet for further holding the face fiber in place. The adhesive is typically a latex coating, such as a styrene-butadiene rubber (SBR), and may include a variety of inorganic materials such as calcium carbonate, clay or hydrated alumina fillers. Before the adhesive is cured, a second fabric, commonly referred to as a secondary backing, is attached to the back of the carpet. The secondary backing is typically made of polypropylene fabric; however, woven jute is sometimes employed. As a further example, tufted broadloom carpet may include a foamed backing, made of SBR latex or polyurethane, in place of the fabric secondary backing. These latter carpets are common in European markets.

Typically, the face fiber constitutes only 20–50% by weight of the carpet, with the balance being comprised of the backing material and adhesive. In addition, the face fiber may contain dyes, soil repellents, stabilizers and other compounds added during fiber and/or carpet manufacture. Waste carpet may also contain a host of other impurities, which will collectively be referred to herein as "dirt".

It has been desired to develop practical and economical methods to recover the materials of carpet waste, especially the polymeric face fiber, for processing into a desired end product. For example, it has been proposed to recover polymeric face fiber material which may then be depolymerized to yield a desired monomer, for subsequent repolymerization to make new articles. In the case of nylon face fiber, a desired monomer to be recovered is caprolactam.

One approach to recovery of materials from waste carpet involves depolymerization with a feedstock of essentially whole carpet. However, a feedstock of essentially whole carpet is not suitable for all depolymerization processes as the non-face fiber materials may interfere substantially with the depolymerization process, and thereby render the process uneconomical or impractical.

Other approaches for recovery of waste carpet materials have involved an initial separation process wherein face fiber is at least partially separated from the backing material, and the separated face fiber material is then depolymerized to recover the desired monomer. One example of such a separation process involves mechanical shearing of carpet to remove a portion of the face fiber from the backing. Unfortunately, since a great deal of the face fiber is below the surface of the primary backing, much of the face fiber is not recovered by the shearing process. Also, mechanical shearing of face fiber from post-consumer carpet presents logistical problems. The carpet must be presented to the shearing device flat and neatly spread out, whereas post-consumer carpet comes in all shapes and sizes making it difficult to properly present to the shearing device.

As a further example of a separation process for waste carpet, U.S. Pat. No. 5,230,473 to Hagguist et al. describes a method for reclaiming carpet through a process which softens the latex adhesives with steam or water, then tears the face fiber out of the backings using a series of brushes and serrated rolls. This process suffers from deficiencies similar to the aforementioned shearing device.

Therefore, a need exists for an efficient and effective method of separating and recovering the components of waste carpet material without substantial loss of face fiber and whereby the recovered face fiber material is sufficiently pure that further processing of the recovered components to desired end products is feasible.

SUMMARY OF THE INVENTION

The present invention provides a process for recovering a face fiber material from a waste carpet material. The process comprises:

a. providing a feedstock including a waste carpet material comprised of a face fiber material, a backing and an adhesive material;

b. removing a portion of the adhesive material from the feedstock to obtain a first mixture comprising a portion of the face fiber material;

c. passing the first mixture and a liquid medium, preferably water or an aqueous solution, to a hydrocyclone, wherein the face fiber material is substantially separated as a face fiber material stream from other solids in the mixture having a specific gravity different from that of the face fiber material; and d. recovering the separated face fiber material stream.

It is preferred that the removal of the adhesive material from the face fiber material take place in the absence of a liquid medium. Screen separation is a preferred way of removing, optionally preceded by shredding and/or impact force size reduction of the feedstock. It is also optional, but preferred, to include a washing step prior to passing the mixture to the hydrocyclone to reduce the residual adhesive material in the mixture.

The preferred feedstock is whole carpet having a face fiber material of essentially only one type, preferably a polymeric material selected from the group consisting of nylon 6, nylon 66, and polyester, most preferably the former. It is most preferred that the other solids separated from the face fiber material in the hydrocyclone include a polypropylene backing material, with the majority of the dirt and any non-polypropylene backing material being separated from the face fiber material prior to the hydrocyclone.

BRIEF DESCRIPTION OF THE DRAWING

The invention will be described in more detail below with reference to the drawing figure, wherein.

DETAILED DESCRIPTION OF THE PREFERRED EMBODIMENTS

As used herein, "carpet material" denotes carpet which has not been subjected to any mechanical or chemical separation (referred to herein as "whole carpet") and/or any mixture of carpet components that is a product of separation, mechanical or otherwise, of whole carpet (referred to herein as "beneficiated carpet"). "Waste carpet material" and like terms denote carpet material that has been, is intended to be, or otherwise would have been discarded by a consumer, manufacturer, distributor, retailer, installer and the like.

As used herein, "latex" denotes carboxylic-styrene-butadiene rubber, styrene-butadiene rubber (SBR), natural rubber latex, or any other natural or synthetic rubber. Latex is commonly employed as an adhesive for holding tufted face fibers to the carpet backing. Foamed latex may also be present as a foamed backing material in some types of carpets.

As used herein, "compounded latex" denotes a latex, and any additives or fillers in the latex. Examples of additives include aluminum trihydrate, flame retardants, foaming agents, frothing agents, water softeners, dispersing agents, thickeners, defoamers, pigments, anti-microbial agents, and stain-resistant chemistries. Common fillers in the latex include calcium carbonate and polyethylene.

As used herein, "adhesive material" denotes material functioning as an adhesive to bind face fiber with backing. Adhesive material includes compounded latex, as mentioned above.

As used herein, "face fiber" denotes the fiber which was tufted through a supportive scrim. This is the fiber which is primarily on the surface of the carpet during its useful life. Face fiber could be nylon 6, nylon 66, polypropylene, polyester, wool, cotton, acrylic, as well as other fibers used for this purpose. By "face fiber material" is meant the face fiber of the waste carpet material feedstock, regardless of physical size or shape. The face fiber material may be a mixture of face fiber types or a single face fiber type, preferably the latter.

As used herein, "primary backing" denotes the supportive scrim through which the face fiber is tufted. This primary backing is usually polypropylene; however, other materials such as polyester may be used, also.

As used herein, "secondary backing" denotes a fabric which is adhered to the back of the carpet, behind the primary backing, with an adhesive material such as compounded latex. The secondary backing is usually a fabric, typically made of polypropylene or jute. As used herein, "foamed backing" denotes a foamed material which is adhered to the back of the carpet, behind the primary backing, with an adhesive material such as compounded latex. The foamed backing is commonly latex or polyurethane. The secondary backing or the foamed backing is the backing that is visible at the side opposite the face of tufted carpet.

One benefit of the present process is that the feedstock can consist in whole or in part of whole carpet waste material, with the balance (if any) consisting of beneficiated carpet waste material. Waste carpet material having nylon 6, nylon 66, and/or polyester face fiber is preferably used as the feed material for the process. It is also preferred, however, that the feedstock not include mixtures of face fiber types; rather, the waste carpet material is first sorted by face fiber type, and the system is fed carpet waste material of one face fiber type at a time.

An additional benefit of the present invention is that the feedstock waste carpet material does not have to be washed to remove dirt, or be subjected to pretreatment to remove other components, prior to entering the separation system. For example, although the carpet material can be pretreated with steam, followed by mechanically or manually removing the secondary backing, such a step is unnecessary.

Accordingly, in the following description of preferred embodiments, where reference is made to a feedstock consisting of whole carpet waste material, it is to be understood that beneficiated carpet waste material may be included with, or substituted for, the whole carpet material as a feedstock.

The process includes operations to remove adhesive material from the feedstock to obtain a first mixture comprising at least a portion of the face fiber material. When the feedstock includes whole carpet waste material, it is preferably subjected to an initial primary size reduction.

Primary size reduction serves to reduce the size of the waste carpet material into sizes that are more easily managed in later stages of the process and to initiate separation of the face fiber and backing material from the adhesive coating. In general, size reduction involves subjecting the waste carpet material to sufficient shredding or cutting forces so that a mixture of smaller carpet pieces is obtained, as well as distinct pieces of face fiber, compounded latex, and various backing materials such as polypropylene and jute.

The primary size reduction can be effected by various types of conventional, commercially available, size reduction equipment such as guillotines, rotary cutters, shear shredders, open rotor granulators, closed rotor grinders, and rotor shredding machines. The exact configuration of the primary size reduction equipment is not critical, so long as the size reduction operation does not produce a substantial amount of fine face fiber particles that can be lost in later operations to thus preclude their recovery. Accordingly, shredding is preferred to grinding operations, and especially fine grinding and multiple grinding steps preferably are avoided. A rotor shredding machine is especially suited for a feedstock composed of whole carpet waste material. This apparatus permits direct feeding of bales of carpet, and the carpet waste material can be size reduced without the need for additional size reduction apparatus, thus reducing capital requirements. Further, particles of relatively uniform size are obtained.

The feedstock, now composed of size reduced carpet material, is subjected to separation operations to remove at least a portion, preferably at least about 20 weight percent, of the adhesive material therefrom. More specifically, a primary function of these operations is to separate adhesive material, especially compounded latex, from the face fiber and the backing material. These operations also serve to remove the majority of any dirt present in the waste carpet material. The removal of adhesive material preferably involves a series of mechanical, dry separation operations, which are optionally followed by a wet separation operation prior to fluidic separation in the hydrocyclone. By dry separation is meant that the operations do not require a liquid separation medium.

It is preferred that the dry separation operations include an initial screen separation of the adhesive material and dirt from the face fibers. This step takes advantage of the relatively large difference in particle size and shape between the fibrous face fiber and the compounded latex. The screening involves passing the size reduced waste carpet material feedstock through at least one screen that has a mesh designed to retain the larger materials (including face fiber, and other material that may be in fibrous form, such as primary backing material and secondary backing material) while passing through the smaller particles (including particles of compounded latex and dirt).

Screen openings (mesh size) for this screen are selected based on the desired products and desired fibrous material yield. Generally, the yield of fibrous material (i.e., the amount of original fibrous material obtained by the screening that is available for further processing) will be balanced by purity of the fibrous material (i.e., the amount of adhesive material remaining in the fibrous material for further processing). Since further separation operations follow, it is not necessary to maintain a high purity of fibrous material from this initial screening operation.

In some cases, it may be desirable to use several screens of differing mesh size to reclaim a variety of products from dry separation, for example, a series of screens with 4000 micron, 600 micron, 250 micron and 150 micron openings. The coarser products, for example particles larger than 600 microns, are sent to the next step in the separation system. The finer products, for example particles smaller than 600 microns, are disposed of or reclaimed, as desired.

Although various commercial screens can be used, a linear gyratory sifting screen with openings ranging in size from about 150 to 4000 microns is preferred since it provides satisfactory face fiber yield and product purity. A screen of this type is manufactured by Rotex, Inc., Cincinnati, Ohio, USA. It is also possible to use various vibratory screens, but in some cases yield of face fiber may be reduced.

In the preferred embodiment, the dry separation operation following the initial screening also involves subjecting the mixture of face fiber material and any remaining adhesive material to impact forces to reduce particle sizes thereof, followed by screen separation of adhesive material from the face fiber material. This impact size reduction serves to liberate residual compounded latex from the fibrous components such as the face fiber, and the primary and secondary backings. In doing so, impact size reduction selectively size reduces the compounded latex without significantly size reducing the fibrous components. Consequently, the compounded latex components become smaller than the fibrous components and thus are more easily separated therefrom. In other words, this operation serves to maximize the particle size difference between the compounded latex particles and the fibers.

Many types of impact size reduction equipment are available. One suitable apparatus is a hammer mill comprising a feed hopper through which the waste carpet material is fed, a rotatable shaft in its interior which supports a plurality of swinging hammers, and a grooved abrasion plate. The hammers force the waste carpet material across the grooves of the abrasion plate, thereby ripping and abrading the material until it has been liberated into distinct particles of face fiber, compounded latex, primary backing material, or secondary backing material. Generally, a screen may be placed across the bottom of the hammer mill. Since fibrous material will not pass easily through the hammer mill screen, it may be necessary to evacuate the device by pulling air through it via, e.g., a fan. The amount of air necessary will depend on the size of the screen used in and the throughput of the hammer mill. To separate the waste carpet materials from air, a condenser or gas cyclone, known in the textile industry, can be used.

Following impact size reduction, the mixture of face fiber material is screened again to remove additional residual adhesive material. Screening apparatus similar to that used in the initial screening, but with smaller screen openings, can be employed. Additional dry separation operations can optionally be included, if desired, to improve the purity of the fibrous material obtained in the first mixture. As an example, the material can be air sifted to remove residual large particles of adhesive material and dirt. For this operation, the fibrous material particles recovered from the screening operation are suspended in a stream of air, and any particles that are too heavy to be supported by the air stream are removed. If the removed particles include a significant amount of fibrous material, these particles can be recycled to the impact size reduction operation. Useful air sifting equipment includes, by way of example, air elutriators, centrifugal air separators, zigzag separators, and air condensers.

The above-described dry separation operations produce a first mixture that includes face fiber material, as well as backing materials such as polypropylene and/or jute. In the preferred embodiment, the first mixture at this point includes: about 50 to about 80, more preferably about 60 to about 70, weight percent face fiber material; about 5 to about 15, more preferably about 8 to about 14, weight percent backing material; and about 5 to about 40, preferably less than about 35, weight percent residual compounded latex; based on the total weight of the first mixture. The separated (removed) adhesive material mixture at this point includes about 50 to about 90, preferably about 80 to about 90, weight percent compounded latex; about 4 to about 20, preferably about 4 to about 10, weight percent dirt; and about 5 to about 40, preferably less than about 10 weight percent residual face fiber material; based on the total weight of the adhesive material mixture. It should be recognized that the exact weight percent distribution of the components will partially depend upon the weight percent distribution of the components in the initial waste carpet material feedstock. The separated adhesive material mixture may be recovered at this point if desired.

The dry separation operation preferably includes a further size reduction of the relatively coarse face fiber material. If the face fibers are too long they tend to tangle and flocculate, making it difficult to separate them, and if they are too short, yield becomes a problem in the subsequent fluidic separation step. It is preferable to further size reduce fibers which are longer than about 0.16 inch (4.00 millimeters). This can be done by choosing the top two screens of the linear gyratory sifting screen, previously described, to have, e.g., about 0.16 and about 0.02 inch openings (4000 and 600 microns, respectively). Material which is between about 0.16 inch and about 0.02 inch is diverted directly to the fluidic separation, or optionally to the washing system/operation that preferably precedes the fluidic separation, and the material which passes over the about 0.16 inch screen is further size reduced.

An alternative, but preferred, manner of reducing the length of the relatively coarse face fiber material utilizes a wet granulator such as is manufactured by Herbold GmbH Maschinenfabrik, Meckesheim, Germany. The screen in this wet granulator should be chosen so that the fibers in the product thereof are no longer than about 1 inch (25.64 millimeters), preferably no longer than about 0.25 inch (6.41 millimeters). An advantage to using a wet granulator for this final size reduction step is that the granulator itself acts as a washing step, to thereby improve the wetting and liberation of compounded latex, soil and dirt.

The next essential operation of the present process is a fluidic separation employing a hydrocyclone. The primary purpose of this operation is to substantially separate for recovery the backing material and the face fiber material components of the first mixture. Although any liquid can be used as the separating medium, water is preferred due to its low cost and preferred specific gravity.

Prior to fluidic separation in a hydrocyclone, however, the first mixture can and preferably is subjected to a washing separation process for further purification of the fiber face material. There are several advantages to having material with a lower level of impurities. A reduced level of polypropylene (from the backing) would eliminate the need for compatibilizers and would improve the properties of a nylon 6, nylon 66, or polyester engineered plastic resin. Also, in the case of nylon 6, further removal of calcium carbonate (from residual adhesive latex) and polypropylene would improve the caprolactam yield and reduce the demand for catalyst in conventional phosphoric acid depolymerization.

Subsequent to dry separation to remove most of the adhesive material from the feedstock, and preferably after further size reduction in the wet granulator, the face fiber material is ready for washing. A de-watering screw is used to transport the material to and from the washer(s). The screen for the de-watering screw has openings finer than about 0.007 inch (180 microns), preferably finer than about 0.006 inches (150 microns). The de-watering screw can be fitted with either stationary or moving spray bars to enhance rinsing. Water removed from the initial de-watering screw can be sent to a filtration device to remove any solids; about 5 to 30 percent of this water is purged from the system, with the balance being re-circulated through the wet granulator.

For the washing operation, there are a number of commercially available washing systems that can be used. The important parameters of these systems are the dwell time and the amount of liquid shear force present. The preferred dwell time is at least about three minutes, and the greater the liquid shear forces the better. After the washer, the material is again de-watered using a de-watering screw similar to that previously described. The water removed by this de-watering screw is re-circulated through the wet granulator.

According to the preferred embodiment washing should be performed in three stages. Each stage has a washer with a dwell time of from about 30 to about 120 seconds, preferably about 60 seconds. A suitable washer is an agitation washer manufactured by Sterling Systems, Lynchburg, Va. After each washer is a de-watering screw with a similar construction to that used after the wet granulator. A percentage of the water from each de-watering screw is preferably used as make-up water for the wet granulator or one of the preceding washers. For example, the water removed by the de-watering screw after the third washer can be used as make up water for the second washer; water removed by the de-watering screw after the second washer can be used as make up water for the first washer; and water removed by the de-watering screw after the first washer can be used as make-up water for the wet granulator (countercurrent washing process).

The washing operation may optionally employ an additive that improves the wetting of the face fiber/backing mixture to facilitate the subsequent separation process, i.e., improve the removal of oils and dirt as well as the liberation of compounded latex from the face fiber. A preferred additive is sodium hydroxide, in the amount of about 0.1 to 10.0, preferably about 0.5 to 2.0, g per liter of the wash slurry. It should be noted, however, that in the case of nylon, sodium hydroxide can cause degradation. Also, in the case of nylon 6, if the material is to be depolymerized, the sodium hydroxide could consume phosphoric acid in a conventional depolymerization reactor. For this reason it is preferred to add a small amount of acetic acid to the final rinse to neutralize the sodium hydroxide without concentrating when the fiber (nylon 6) is dried. Only enough acetic acid is used in the final rinse to bring the pH of the rinsed material to slightly acidic, preferably between about 6.5 and 7.0. If sodium hydroxide is used in the wash water, care should be taken to keep the water from the washing system separate from the water in the downstream fluidic separation system since sodium hydroxide at increased levels can change the viscosity and specific gravity of water, to thereby adversely influence the separation efficiency of the system.

Commercial surfactants can be used as wash water additives also, such as the non-ionic surfactant octylphenoxypolyethoxyethanol, available from Rohm and Haas Company under the trade name Triton X-100. About 0.1 to 10.0, preferably about 0.5 to 2.0, g of Triton X-100 can be added per liter of the wash water slurry. If a surfactant is used, it may be necessary to add a small amount (0.01 grams per liter to 0.5 grams per liter) of a defoamer. Triton X-100 is a preferred additive because it significantly reduces the bond strength between compounded latex and face fiber to thereby facilitate the liberation of compounded latex during the washing operation. Surfactants also facilitate removal of dirt and oils from the face fiber.

An important variable in washing is the temperature of the washing slurry. Increased wet temperature reduces the bond strength between the compounded latex and the face fiber, thus facilitating the liberation of latex in the washing operation. The increased temperature also increases the speed of wetting to allow more time for dirt and oil to be removed from face fiber. Elevated temperatures enhance the effect of the washing operation, with temperatures of from about 40 to about 90° C., preferably about 50 to about 85° C., during the washing operation being preferred. The material from such a washing system contains significantly less compounded latex and dirt, and may be recovered for use in various products.

Figure 1:
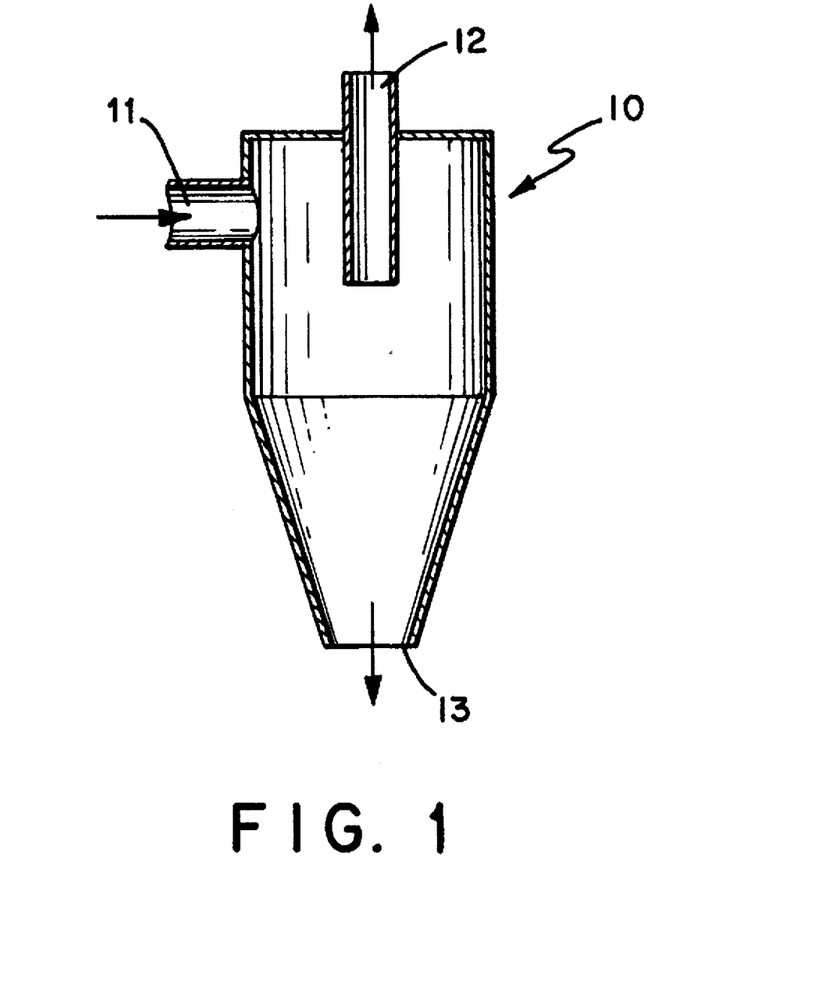
FIG. 1 is a diagram of a typical hydrocyclone 10.

From the optional but preferred washing step, efficient and substantially complete separation of the components of the washed, dry separated face fiber material mixture is achieved by passing the mixture and a liquid, preferably aqueous, vehicle through at least one hydrocyclone. A hydrocyclone is a commercially available apparatus in which a vortex of water is generated to separate components of mixtures by relative densities. FIG. 1 is a diagram of a typical hydrocyclone 10. A slurry of the washed, dry separated face fiber material mixture is pumped into the inlet opening 11 on the side of the hydrocyclone 10. Because of the circular cross-section of the hydrocyclone, a vortex of the slurry is formed. There are openings 12 and 13, respectively, in the top and the bottom of the hydrocyclone. Depending on the pressure, the diameter of the hydrocyclone, the diameter of the inlet opening 11, the diameter of the underflow opening 13, and the diameter of the vortex finder (or overflow opening 12), a certain percentage of the water in the slurry will exit the hydrocyclone 10 through the overflow opening 12, and the rest will exit the hydrocyclone 10 through the underflow opening 13. The components that are lighter than water (i.e., polypropylene) tend to travel with the water through the overflow opening 12, and the materials that are heavier than water (i.e., nylon 6, nylon 66, or polyester) tend to flow out the bottom of the hydrocyclone through the underflow opening 13. Materials recovered from the overflow of a properly designed hydrocyclone are primarily polypropylene primary backing, polypropylene secondary backing, and polypropylene face fiber (referred to herein as the "backing stream"). The materials recovered from the underflow opening of an appropriately designed hydrocyclone are primarily face fiber (i.e., nylon 6, nylon 66, polyester, wool, or acrylic) with some amount of jute secondary backing and residual compounded latex. This stream is referred to herein as the "face fiber material stream".

The separation of materials that are lighter than water from materials heavier than water is a relatively easy task when the difference between their specific gravities is large (e.g., polypropylene from polyester). However, it is much more difficult to separate two polymers both having specific gravities close to that of water (e.g., polypropylene from nylon 6 or from nylon 66). Also the fact that these materials are in fiber form and vary a great deal in length makes this separation more difficult and unique. This invention utilizes the geometry of the hydrocyclone to enhance the separation efficiency when two materials with specific gravities close to that of water are to be separated.

It also should be noted that it is possible in a fluidic separation to use a liquid medium other then water, for example, an aqueous solution such as saline. The liquid medium can be chosen based on specific gravity. This would be an advantage in trying to separate two materials with specific gravities heavier then water (e.g., nylon 6 from polyester, or nylon 66 from polyester, or nylon 6 from jute, or nylon 66 from jute, or polyester from jute, or nylon 6 from compounded latex, or nylon 66 from compounded latex, or polyester from compounded latex). In this case the salt is used to change the specific gravity of the liquid. Enough of the salt is added to bring the specific gravity of the liquid to a value between the specific gravities of the two materials to be separated. Suitable salts for altering the specific gravity of a liquid such as water include, by way of example, sodium chloride, ammonium nitrate and ammonium sulfate. A preferred separation medium is a solution of water with about 35 weight percent ammonium sulfate (20° C.).

With respect to the hydrocyclone, it has been found that certain design features are important. These features include the ratio of the inlet diameter to the diameter of the hydrocyclone, the ratio of the overflow opening diameter to the hydrocyclone diameter, the ratio of the underflow opening diameter to the diameter of the hydrocyclone, the cone angle of the hydrocyclone, and the water (liquid) pressure.

To some extent the diameter of the hydrocyclone can be selected based on desired throughput and efficiency. As indicated above, the selected hydrocyclone diameter is a determinative factor in the design of the other features of the hydrocyclone, namely, the inlet diameter, the overflow opening diameter and the under-flow opening diameter. Large hydrocyclones (larger than 30 inches diameter) are not recommended because yield loss of the very short face fiber will increase as the diameter increases. In other words, as the diameter of the hydrocyclone increases, more short face fiber will exit the hydrocyclone through the overflow opening with the backing stream. However, very small hydrocyclones (smaller than 1.5 inches diameter) don't work well either, because the size of the proper inlet opening is so small that this opening tends to clog with fiber.

The ratio of the inlet diameter to the hydrocyclone diameter should be less than about 0.5:1.0, preferably about 0.13:1.0. The size of the inlet has a strong influence on the face fiber yield. As the ratio of the inlet diameter to the hydrocyclone diameter increases from about 0.13:1.0, more of the face fiber exits the hydrocyclone through the overflow opening with the backing stream. The ratio of the overflow opening diameter to the hydrocyclone diameter should be less than about 0.80:1.0, preferably about 0.23:1.0. The ratio of the underflow opening diameter to the hydrocyclone diameter should be less than about 0.92:1.0, preferably about 0.20:1.0. The relative sizes of the overflow and underflow openings determine the percentage of water which flows through the overflow and underflow openings. By adjusting the size of either of these openings it is possible to control the percentage of the face fiber which exits the hydrocyclone through these openings. For example, by using a slightly larger overflow opening, improved purity can be achieved in the face fiber stream. Unfortunately, this improvement in purity is achieved at the expense of face fiber yield. The preferred settings for the hydrocyclone have been chosen because this combination has been shown to produce the highest separation efficiencies in experiments performed on washed, dry separated fiber from carpet.

The water (liquid) pressure to the feed of the hydrocyclone is not critical to the separation efficiency of washed, dry separated fiber. Higher pressures increase the throughput of the hydrocyclone, as well as the centrifugal forces in the hydrocyclone, which slightly improves the separation efficiency. However, higher pressures create the need for more expensive pumps and higher power costs in running these pumps. There is thus an economic trade off between higher throughput, purity, and lower capital and power requirements. When choosing the proper pressure to operate the hydrocyclone, operating costs may be a primary consideration. In locations where utilities are very expensive (e.g., Europe), several hydrocyclones can be effectively used in parallel at lower pressures. In locations where power is less expensive (e.g., United States), the preferred manner of increasing the throughput of the system will be through an increase in pressure.

A hydrocyclone with a cone angle of up to about 20° works well for this application. Cone angles larger than about 20° tend to allow more of the face fiber to exit the hydrocyclone through the overflow opening, resulting in reduced yield. Although cone angles smaller than about 20° are acceptable, the decrease in angle tends to increase residual polypropylene in the final face fiber product.

There is also benefit to using more than one hydrocyclone in tandem. A system of one to three hydrocyclones can be set up to do a separation of the face fiber from polypropylene. Separating the washed, dry separated fiber through a single hydrocyclone does improve the purity of the face fiber stream significantly; however, some polypropylene remains in the face fiber stream, and some face fiber is lost in the polypropylene stream. By mixing the face fiber stream which exits the underflow opening of the first hydrocyclone back into a slurry, and passing that slurry through a second hydrocyclone of the same design, the purity can be further improved. The material which exits the bottom of the second hydrocyclone is a relatively pure face fiber product. After being de-watered and dried the composition of this product is about 77 to about 98 percent face fiber, based on the weight of the composition, with the remaining material being primarily residual compounded latex and a lesser amount of residual polypropylene. The overflow from the second hydrocyclone should be re-circulated back into the slurry tank for the first hydrocyclone. By mixing a slurry of the polypropylene stream which passes through the overflow opening of the first hydrocyclone and passing that slurry through a third hydrocyclone of the same design, the system yield can be improved. The product from the overflow of this third hydrocyclone is relatively pure polypropylene fiber. After being de-watered and dried its composition is about 80 to about 95 percent polypropylene, based on the weight of the composition, with the remaining portion being primarily residual face fiber with a lesser amount of residual compounded latex which has a low amount of calcium carbonate filler. The product from the underflow of the third hydrocyclone should be re-circulated back to the slurry tank for the feed of the first hydrocyclone. In a similar manner it would be possible to add additional hydrocyclones in tandem to improve both the purity and yield; however, progressively smaller improvements are made by the addition of each hydrocyclone.

If the waste carpet material feedstock has polypropylene backing, the amount of polypropylene in the backing stream and the amount of face fiber in the face fiber stream will vary depending upon various factors, including the number of hydrocyclones through which the mixture has passed and the content of the feed mixture to the wet separation system.

The method and conditions under which the washed, dry separated fiber is introduced into each hydrocyclone may vary depending upon, for example, the number of hydrocyclones, the throughput amount, the weight percent distribution between the face fiber and backing components and the like. In general, however, the pressure drop through the hydrocyclone preferably is between about 4 p.s.i. and about 80 p.s.i., preferably about 10 p.s.i. to about 50 p.s.i., with a temperature of about 1 to about 99° C., preferably about 22° C. The ratio of water to the solid particles of the washed, dry separated fiber based on weight as the slurry enters the hydrocyclone should be less than about 100:3, preferably about 100:2.

An important aspect of the operation of the hydrocyclone is the particle size of the feed material. While hydrocyclones separate material based on specific gravity, they also classify particles based on particle size. This is important because very fine particles of fiber with specific gravities heavier than water tend to exit the hydrocyclone through the overflow opening with the backing stream, to result in a yield loss. For this reason control of particle size distribution of the dry separated fiber is important. Fiber which is too long will not be easily separated due to entangling and flocculation, and fiber which is too short will result in a yield loss. It is possible to operate this process with fiber lengths between about 0.03 and 1.0 inch (about 0.80 and 26 millimeters, respectively), but preferred fiber lengths are between about 0.08 and 0.25 inch (about 2.0 and 6.0 mm). Fiber lengths outside of this range preferably are limited.

Another aspect of wet separation with a hydrocyclone is foaming. Many post-consumer carpets contain soaps and cleaning agents used by the consumer to clean the carpet. These cleaning agents can create a great deal of foam in the optional washing and subsequent fluidic separation systems. This foam causes pumps to cavitate and also interferes with the performance of the hydrocyclones. For this reason and for the improved removal of dirt it is preferred to counter flow the water from the separation slurry tanks to the washing system and from the washing system to the wet granulator. Counter flowing the water reduces the dirt in the separation slurry tanks, to provide cleaner recovered fiber, and also reduces the level of surfactants, soaps, and cleaning solutions in the separation system. Also, a small amount of a defoamer may optionally be added, if necessary, in the separation process slurry tanks for removal of foam from the separation system. A preferred additive for the control of foam is a silicon defoamer. The addition of about 0.01 to about 1.00, preferably about 0.10 to about 0.50 grams per liter of a silicon defoamer should be sufficient.

In the preferred embodiment, the washed and dry separated fiber is passed through three hydrocyclones. The mixture from the first slurry tank which includes an agitator feeds the first hydrocyclone. The amount of solids in this first slurry tank should be about 1 to about 3 weight percent, based on the weight of the mixture in the process tank. The overflow stream (primarily polypropylene) from the first hydrocyclone goes to a third slurry tank that includes an agitator. The amount of solids in the third process tank should range from about 1 to about 3 weight percent, based on the weight of the mixture in the process tank. The underflow stream (primarily face fiber material) from the first hydrocyclone goes to a second slurry tank that includes an agitator. The amount of solids in the second process tank should range from about 1 to about 3 weight percent, based on the weight of the mixture in the process tank.

The mixture from the third process tank feeds into a third hydrocyclone that has the same or similar design as the first hydrocyclone. The third hydrocyclone improves the yield of the process. The solids in the overflow stream from the third hydrocyclone include about 80 to about 95, preferably about 90 to about 95, weight percent polypropylene with about 5 to about 20, preferably about 10, weight percent impurities (primarily face fiber), based on the weight of the solids. The solids from the overflow stream can be de-watered, dried and used as recovered polypropylene. The underflow stream from the third hydrocyclone is re-circulated back to the first slurry tank.

The mixture from the second slurry tank is fed into a second hydrocyclone that has the same or similar design to the first hydrocyclone. The second hydrocyclone serves to improve the purity of the material recovered from the face fiber in the end product of the process. The overflow stream from the second hydrocyclone is re-circulated back to the first process tank. The solids in the underflow stream from the second hydrocyclone includes about 77 to about 98, preferably about 92 to about 98, weight percent face fiber, about 0.3 to about 2.0, preferably less than about 1, weight percent SBR latex, about 0.5 to about 9, preferably less than about 2, weight percent polypropylene, about 1 to about 6, preferably less than about 2, weight percent filler (primarily calcium carbonate), and about 0.2 to about 6, preferably less than about 1, weight percent other impurities.

The underflow stream (in other words, the face fiber material stream) from the second hydrocyclone is then preferably passed over a wet shaking table to further separate the face fiber from the other materials. It is possible to remove about 61 percent of the remaining calcium carbonate with about a 1 percent yield loss (face fiber), about 69 percent of the remaining calcium carbonate with about a 2 percent yield loss, and about 79 percent of the remaining calcium carbonate with about a 9 percent yield loss.

The fiber product of the wet shaking table is then preferably rinsed and de-watered. The rinsing and the bulk of de-watering can be accomplished in the same step, preferably over a linear vibratory de-watering screen. Rinsing is accomplished with a series of spray bars. Additives, as desired, for treating the product can be added via these spray bars. Further de-watering, if desired, can be by any conventional means such as a screw press, de-watering screw, v-press, centrifuge, or continuous centrifuge.

If drying of this material is desired, several commercially available dryers are suitable, e.g., a continuous conveyor dryer (National Drying Machinery Company, Philadelphia, Pa.), a radio frequency dryer (Stalam S.r.l., Nove, Italy), or a flash dryer (Fluid Energy Aljet, Plumsteadville, Pa.). At the conclusion of the de-watering and drying, the resulting material should have a moisture content of up to about 4.0, preferably about 3.0 to about 4.0, weight percent, based on the weight of the material.

If the recovered face fiber material is to be used for an engineering resin, the underflow stream from the second hydrocyclone is de-watered and rinsed (using a series of spray bars) on a linear vibratory screener. Additional de-watering then is done with a continuous centrifuge so that the moisture content of the material is reduced to about 20 to 50 weight percent, preferably about 20 to 30 weight percent, based on the weight of the material. The material is then dried in a flash dryer. The de-watered and dried face fiber material is then densified. The densification product can be in the form of a fiber bale or fused pellets According to another preferred embodiment, if the recovered face fiber material is to be used for depolymerization, the underflow stream from the second hydrocyclone is de-watered and rinsed as described above for material to be used in an engineering resin. The damp fiber can then be fed directly to a depolymerization reactor, or it can be dried and baled for storage prior to depolymerization.

As set forth previously, the specific gravity of the liquid medium can be altered for the purpose of performing a wet separation in the hydrocyclone(s). To demonstrate this, a slurry was created containing 500 g of nylon 6 fiber, 500 g of SBR/calcium carbonate compounded latex, and 99 kg of a liquid medium. The liquid medium comprised a solution of 1.194 kg/l of ammonium sulfate in water at 20° C. The slurry was pumped into a hydrocyclone at 1 bar of pressure. The hydrocyclone had the following dimensions: 60 mm diameter, 20° cone angle, 8 mm diameter inlet opening, 14 mm diameter overflow opening, and 10 mm diameter underflow opening. About 95% of the calcium carbonate and latex was recovered in the underflow stream, and about 76% of the nylon 6 was recovered in the overflow stream in a single pass system.

An alternate wet separation technique, a float sink operation, was found to be unsatisfactory for the process of this invention. In float sink a slurry of the washed, dry separated fiber is pumped into a settling tank. On the far end of the tank, water is overflowed into a de-watering device. The material recovered from this stream is polypropylene. In the bottom of this tank is a screw auger which slowly removes any material which sinks. The product which would be recovered in this stream would be primarily face fiber with some amount of residual compounded latex, jute, and dirt. The size of the float sink tank necessary to allow the fibers with specific gravities close to but below that of water to sink was prohibitively large.

Figure 2:
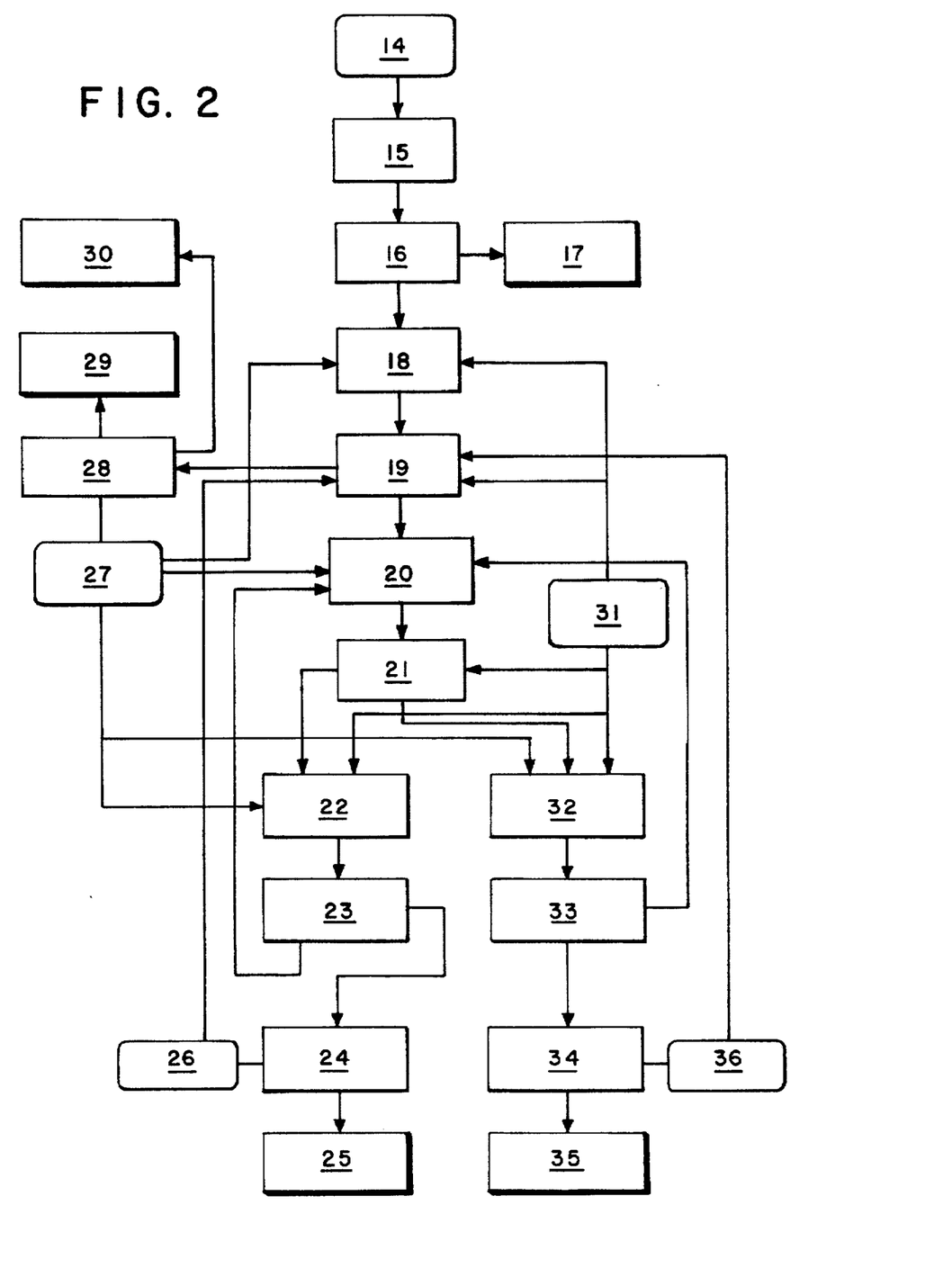
FIG. 2 is a schematic diagram of a representative embodiment of the process of the invention.

FIG. 2 is a schematic diagram setting forth the previously described carpet separation process and including most of the steps previously indicated as optional. Whole carpet 14 which has been sorted by face fiber type is fed to the size reduction equipment 15. This equipment not only reduces the particle size of the post-consumer carpet, but also liberates adhesives and dirt 17 so that they can be removed in a dry separation process 16. Dry separation process 16 can be effectively carded out either through a screening operation or through air separation.

The dry separated fibrous material from step 16 is then further size reduced preferably in a wet granulator 18. The product of this wet granulator 18 then goes through a washing system 19 to further remove residual adhesive and dirt which was not removed in the dry separation process 16. The water, adhesive and dirt mixture removed from this washing system 19 goes through a filtration system 28, which separates the water from the adhesive and dirt mixture 30. The adhesive and dirt mixture 30 is disposed of. Some of the water 29 is purged from the system, but most of the water is re-circulated and used as make up water 27 to the rest of the system.

The fiber product from the washing system 19 is sent to a mixing or slurry tank 20 where a uniform slurry is formed and pumped to hydrocyclone 21, described previously in conjunction with FIG. 1. The overflow stream of hydrocyclone 21 (a slurry of primarily water and polypropylene) is deposited in a second mixing or slurry tank 22, and the underflow stream of hydrocyclone 21 (a slurry of primarily water and carpet face fiber) is deposited in a third mixing or slurry tank 32.

Slurry tank 22 produces a uniform slurry which is pumped to hydrocyclone 23. The overflow stream of hydrocyclone 23 is de-watered and dried at 24. The water removed in the de-watering step 24 is used as make up water 26 for the washing system 19. The dried product 25 is polypropylene fiber. The underflow stream of hydrocyclone 23 is deposited in slurry tank 20.

Slurry tank 32 produces a uniform slurry of primarily water and carpet face fiber which is pumped to hydrocyclone 33. The overflow stream of hydrocyclone 33 is deposited in slurry tank 20. The underflow stream of hydrocyclone 33 is de-watered and dried at 34. The water removed in the de-watering and drying step 34 is used as make up water 36 for the washing process 19. The dried product 35 is relatively pure carpet face fiber.

Some amount of fresh make up water 31 is required. This water is added to the wet granulator 18, washing 19, slurry tanks 20, 22, and 32, as well as used in a rinse in the de-watering steps 24 and 34. All of the water used for a rinse in the de-watering steps 24 and 34 is fresh make up water. The bulk of the remaining make up water is added to the slurry tanks 20, 22, and 32, as needed.

From the foregoing description, one skilled in the art can easily ascertain the essential characteristics of this invention, and without departing from the spirit and scope thereof, can make various changes and modifications of the invention to adapt it to various usages and conditions.

We claim:

1. A process for recovering a face fiber material from a waste carpet material, said process comprising:

a. providing a feedstock including a waste carpet material comprised of a face fiber material, a backing and an adhesive material;

b. removing a portion of the adhesive material from the feedstock to obtain a first mixture comprising a portion of the face fiber material;

c. passing the first mixture and a liquid medium to a hydrocyclone, wherein the face fiber material is substantially separated, as a face fiber material stream, from other solids in the mixture having a specific gravity different from the face fiber material; and d. recovering the separated face fiber material stream.

2. The process of claim 1, wherein the first mixture passed to the hydrocyclone contains less than about 80 weight percent of the adhesive material originally present in the feedstock.

3. The process of claim 1, further comprising washing the first mixture with water or an aqueous solution prior to passing the mixture to the hydrocyclone, to thereby reduce residual adhesive material in the mixture.

4. The process of claim 3, wherein the removal of the adhesive material from the feedstock is accomplished in the absence of a liquid medium, followed by said washing.

5. The process of claim 1, wherein the liquid medium passed to the hydrocyclone with the first mixture is selected from the group consisting of water and an aqueous solution.

6. The process of claim 1 wherein the liquid medium has a specific gravity in between that of the face fiber material and that of the other solids.

7. The process of claim 1, further comprising shredding the waste carpet material in the feedstock prior to the removal of the adhesive material.

8. The process of claim 1, wherein the removal of the adhesive material comprises an initial screen separation of the adhesive material from the face fiber material.

9. The process of claim 1, wherein the removal of the adhesive material comprises subjecting a mixture of the face fiber material and the adhesive material to impact forces to reduce particle sizes thereof, followed by screen separation of the adhesive material from the face fiber material.

10. The process of claim 1, wherein the feedstock consists essentially of whole carpet.

11. The process of claim 1, wherein the face fiber material of the feedstock is essentially of a single type.

12. The process of claim 11, wherein the face fiber material type is nylon 6.

13. The process of claim 1, wherein the other solids include a backing material.

14. The process of claim 13, wherein the backing material comprises polypropylene, and the first mixture added to the hydrocyclone includes a polypropylene backing material having a lower specific gravity than the face fiber material.

15. The process of claim 1, wherein the backing comprises a polypropylene backing material and a foamed backing material.

16. The process of claim 15, wherein the foamed backing material is substantially removed along with the adhesive material, and wherein the first mixture added to the hydrocyclone includes the polypropylene backing material having a lower specific gravity than the face fiber material.

17. The process of claim 15, wherein the foamed backing material includes a foamed latex.

18. The process of claim 1, further comprising removing residual backing material from the face fiber material stream exiting the hydrocyclone.

19. The process of claim 18 wherein the removing step comprises wet table separation.

* * * * *